Patented Jan. 17, 1950

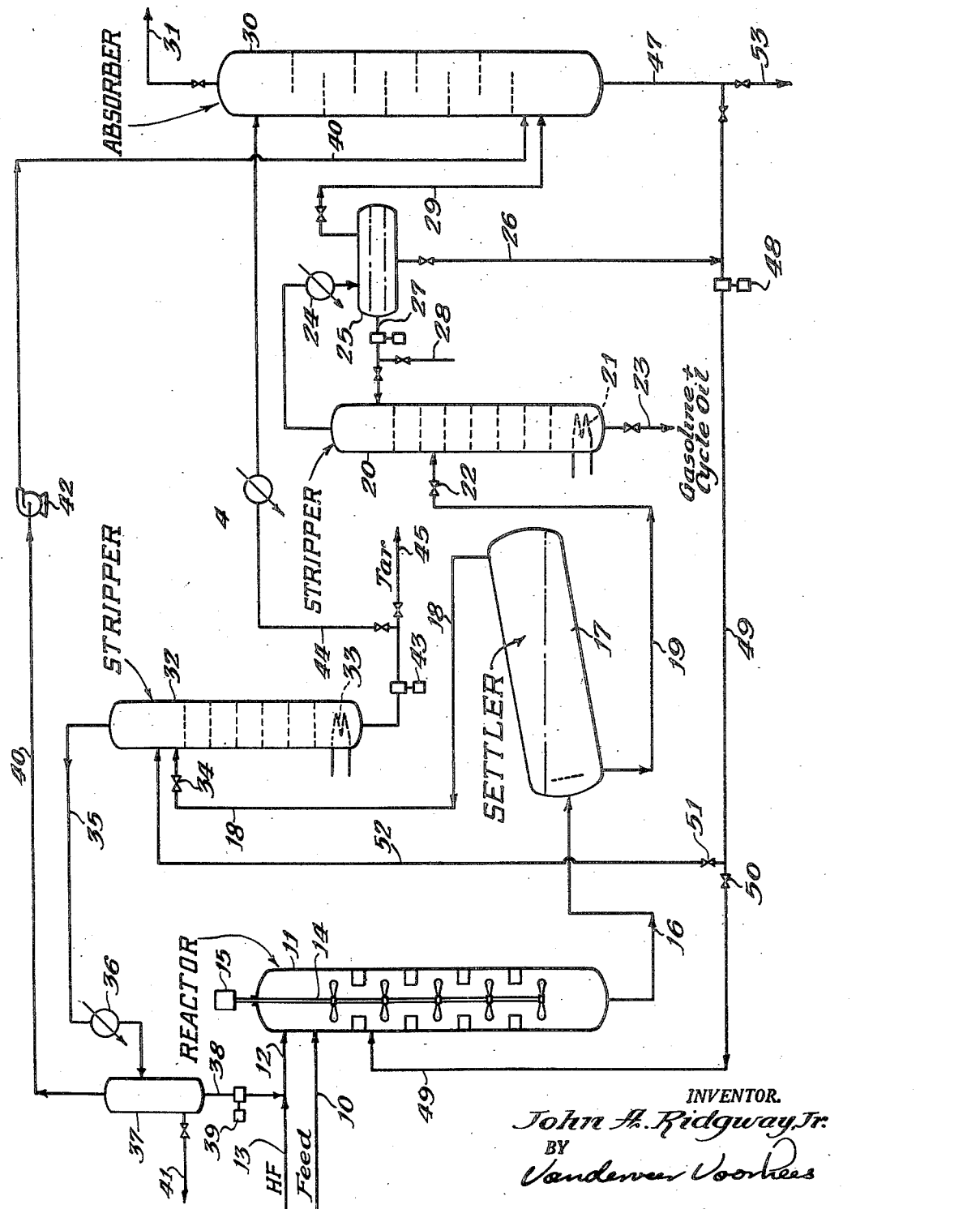

2,495,133

UNITED STATES PATENT OFFICE 2,495,133

TREATING HYDROCARBONS WITH HYDROFLUORIC ACID

John A. Ridgway, Jr., Texas City, Tex., assignor to Pan American Refining Corporation, Texas City, Tex., a corporation of Delaware Application September 20, 1947, Serial No. 775,268

2 Claims. (Cl. 196—52)

This invention relates to the conversion of hydrocarbon oils with hydrofluoric acid catalyst and more particularly it relates to a method of operation in such a conversion process wherein the hydrofluoric acid is recovered and re-employed in the system. The principal object of the invention is to prevent the loss of HF when admixed with the gaseous products of the conversion reaction. Another object of the invention is to recover HF from the products and recycle the recovered HF to the reactor without the necessity of employing expensive absorption oils and without the use of water which requires a reconcentration of the HF. Other objects of the invention will become apparent from the following description thereof.

The invention is illustrated by a drawing which shows diagrammatically an apparatus suitable for carrying out the process. Referring to the drawing, charging stock, which is suitably gas oil or reduced crude oil, is introduced by line 10 into reactor 11, into which is also introduced hydrofluoric acid catalyst by line 12 which is either recycled acid or fresh acid supplied from a source, not shown, by line 13. In reactor 11, the acid and feed stock are thoroughly agitated to obtain intimate mixing, using for this purpose agitator 14 driven by motor 15.

The temperature in the reactor is suitably maintained in the range of about 300 to 450° F., the heat being supplied largely by preheating the feed stock charged by line 10, for example, to a temperature of 400 to 600° F. Additional heat may be supplied directly to reactor 11 by means not shown.

The time of residence of the oil in contact with the catalyst in reactor 11 is suitably from about 5 to 30 minutes, altho considerably shorter times, for example, one minute, may be employed under some conditions. It is preferred to maintain a ratio of catalyst to oil of at least 0.10 to 1, and a ratio within the range of about 0.5 up to 2 to 1 is commonly employed.

The pressure within reactor 11 should be sufficient to maintain the catalyst within the liquid phase and, in general, two liquid phases are present in the reactor, an oil phase and a catalyst phase. The pressure is usually maintained between 500 and 1500 p. s. i.

From the reactor 11, the reaction mixture passes by line 16 to settler 17 where the HF phase separates from the oil phase under the influence of gravity. At reaction temperature the HF phase usually has a lower density than the oil phase, particularly with high ratios of HF/oil, e. g. 1 to 1 or 2 to 1. In this case the HF phase is found at the top and is withdrawn by line 18. With low catalyst-oil ratios and at lower temperatures, e. g. atmospheric temperature up to 200° F., the HF phase will be more dense than the oil phase and will be withdrawn from the bottom. The drawing illustrates an operation in which the HF phase is on the top.

The oil phase in settler 17 comprised chiefly of gasoline produced in the process, unchanged charging stock oil, dissolved gases, and a small amount of dissolved HF, is withdrawn by line 19 leading to stripper 20 where gases and dissolved HF are substantially completely removed by applying heat at the bottom thru coil 21. The pressure in stripper 20 is preferably reduced by valve 22 to a pressure suitable for retaining the desired constituents, e. g. 50 to 300 p. s. i., and to facilitate the removal of dissolved gases. The gasoline and gas oil are withdrawn at the bottom by line 23 and separated by further fractionation by means not shown. Separated gas oil can be recycled as charging stock to the conversion operation in reactor 11.

Hydrofluoric acid gas and hydrocarbon gases are withdrawn from the upper part of stripper 20 and passed thru cooler 24 into separator 25. An HF layer separates at the bottom of separator 25 and is withdrawn thru line 26 to be reused in the process. A light hydrocarbon layer also separates in 25 and is decanted from the HF layer at connection 27 for use as reflux in the upper part of stripper 20. If a butane-free fraction is withdrawn at 23, excess reflux containing butane may be withdrawn at 28. Noncondensable gases saturated with gaseous hydrofluoric acid are conducted by line 29 to the lower part of absorber 30. The gases pass upwardly thru absorber 30, containing suitable baffles of bubble trays, where they come in intimate contact with a stream of unsaturated absorber liquid obtained from the HF phase of the conversion products as will be presently described. Hydrocarbon gases substantially denuded of HF are vented from the top of the absorber by line 31.

The HF phase withdrawn from settler 17 by line 18 passes thru the upper part of stripper 32 wherein the HF is evaporated by heat supplied thru coil 33 or by other suitable means. The pressure in stripper 32 is preferably reduced by pressure-reducing valve 34. The HF vapor together with some dissolved hydrocarbon gases is conducted by line 35 thru condenser 36 to vapor separator 37, the liquid HF collected in the base of the separator being conducted by line 38 and pump 39 back to reactor 11. Any uncondensed gases in 37 are conducted by line 40 to absorber 30 for the recovery of any HF contained therein. Any condensed hydrocarbons may be withdrawn thru line 41. Blower 42 may be employed for transferring the gases where the pressure in 37 is lower than that in 30.

Stripped hydrocarbon liquid in the base of stripper 32 is conducted by pump 43 and line 44 to the upper part of absorber 30 to serve as absorber liquid therein. A portion of this oil may be discarded from the system by valved outlet 45. This oil which may be referred to as tar is a black or dark colored semi-viscous unsaturated hydrocarbon possessing a high absorbing power for HF, either vapor or liquid. It is preferred to cool the stream passing thru line 44 to the absorber, cooler 46 being provided for the purpose.

The tar or HF-soluble oil becomes partially saturated with HF, and some hydrocarbon gases in absorber 30 and is conducted by line 47, pump 48 and line 49 back to reactor 11 where the HF is again brought into contact with additional amounts of hydrocarbon feed stock. The HF-soluble phase likewise assists in promoting the reaction in reactor 11, apparently by acting as a contacting agent. Some further conversion of this oil is simultaneously effected.

By suitably controlling valves 50 and 51, a portion of the recycled HF-soluble oil and dissolved HF can be returned by line 52 to stripper 32 wherein the HF is eliminated and the oil joins the stream from which it was derived. A portion or all the HF-soluble oil may be recycled thru either part of the system, reactor 11, stripper 32, or both, depending on the type of conversion operation and whether it is desirable to return tar to the reactor. If desired, the HF-soluble oil may be distilled by means not shown and the distillate portion used in absorber 30.

It will be noted that all the principal products of the process are substantially free of HF with adequate stripping in strippers 20 and 32. Accordingly these products can be handled in the usual manner without special provision for HF recovery or provision for corrosion control. The HF recovered in absorber 30 is not diluted with water as in some recovery processes and accordingly can be used directly in the conversion of further quantities of oil as in reactor 11. Thus expensive dehydration operations are entirely avoided. Because of the high solubility of HF vapor in the HF-soluble hydrocarbon phase, substantially no HF is lost in the gas vented at 31. The solubility is actually three to four times as great as one would calculate by applying Raoult's law.

In order to still further increase the amount of absorber liquid available in absorber 30, a larger proportion of the HF-soluble oil is recycled by valve 51 and line 52 to stripper 32 and thence by pump 43 and line 44 to the absorber. In this way the actual quantity of HF-soluble oil recycled thru the absorber may be several times the amount of HF-soluble oil produced in a single pass thru reactor 11. Where it is not desired to recycle the HF-soluble oil to the conversion zone, it may be withdrawn from the system by line 45, or by line 53, and the HF dissolved therein may be recovered in a separate stripper not shown in the drawing.

Having thus described my invention what I claim is:

1. The process of converting a heavy hydrocarbon oil which comprises contacting said oil and hydrofluoric acid in a conversion zone, separating conversion products in a separating zone into an oil phase and an HF phase, removing HF from said HF phase in an HF stripping zone thereby producing an HF-soluble substantially free of HF, returning recovered HF from said stripping zone to said conversion zone, removing HF and hydrocarbon gases from said oil phase in a gasoline stripping zone, absorbing HF from admixture with said hydrocarbon gases in an absorption zone wherein said gases are intimately contacted with said HF-soluble oil and recycling said HF-soluble oil containing absorbed HF from said absorption zone to said conversion zone.

2. The process of claim 1 wherein a portion of said HF-soluble oil containing absorbed HF is simultaneously conducted from said absorption zone to said HF stripping zone.

JOHN A. RIDGWAY, Jr.

REFERENCES CITED

The following references are of record in the file of this patent:

UNITED STATES PATENTS

| Number | Name | Date |
|---|---|---|
| 2,371,341 | Matuszak | Mar. 13, 1945 |
| 2,378,762 | Frey | June 19, 1945 |
| 2,427,009 | Lien et al | Sept. 9, 1947 |

Certificate of Correction

Patent No. 2,495,133                                                       January 17, 1950

JOHN A. RIDGWAY, Jr.

It is hereby certified that errors appear in the printed specification of the above numbered patent requiring correction as follows:

Column 2, line 39, for the words "of bubble" read *or bubble*; column 4, line 27, after "HF-soluble" insert *oil*;

and that the said Letters Patent should be read with these corrections therein that the same may conform to the record of the case in the Patent Office.

Signed and sealed this 16th day of May, A. D. 1950.

[SEAL]

THOMAS F. MURPHY,
*Assistant Commissioner of Patents.*